US010534966B1

(12) United States Patent
Tse et al.

(10) Patent No.: US 10,534,966 B1
(45) Date of Patent: Jan. 14, 2020

(54) SYSTEMS AND METHODS FOR IDENTIFYING ACTIVITIES AND/OR EVENTS REPRESENTED IN A VIDEO

(71) Applicant: GOPRO, INC., San Mateo, CA (US)

(72) Inventors: Daniel Tse, San Mateo, CA (US); Desmond Chik, Mountain View, CA (US); Guanhang Wu, Hunan (CN)

(73) Assignee: GoPro, Inc., San Mateo, CA (US)

( * ) Notice: Subject to any disclaimer, the term of this patent is extended or adjusted under 35 U.S.C. 154(b) by 162 days.

(21) Appl. No.: 15/422,852

(22) Filed: Feb. 2, 2017

(51) Int. Cl.
*G06K 9/00* (2006.01)
*G01P 13/00* (2006.01)

(52) U.S. Cl.
CPC .......... *G06K 9/00771* (2013.01); *G01P 13/00* (2013.01)

(58) Field of Classification Search
None
See application file for complete search history.

(56) References Cited

U.S. PATENT DOCUMENTS

| | | | |
|---|---|---|---|
| 5,130,794 | A | 7/1992 | Ritchey |
| 6,337,683 | B1 | 1/2002 | Gilbert |
| 6,593,956 | B1 | 7/2003 | Potts |
| 7,222,356 | B1 | 5/2007 | Yonezawa |
| 7,483,618 | B1 | 1/2009 | Edwards |
| 8,446,433 | B1 | 5/2013 | Mallet |
| 8,611,422 | B1 | 12/2013 | Yagnik |
| 8,718,447 | B2 | 5/2014 | Yang |
| 8,730,299 | B1 | 5/2014 | Kozko |
| 8,763,023 | B1 | 6/2014 | Goetz |
| 8,910,046 | B2 | 12/2014 | Matsuda |
| 8,988,509 | B1 | 3/2015 | Macmillan |
| 9,032,299 | B2 | 5/2015 | Lyons |
| 9,036,001 | B2 | 5/2015 | Chuang |
| 9,077,956 | B1 | 7/2015 | Morgan |
| 9,111,579 | B2 | 8/2015 | Meaney |
| 9,142,253 | B2 | 9/2015 | Ubillos |

(Continued)

FOREIGN PATENT DOCUMENTS

| | | |
|---|---|---|
| WO | 2001020466 | 3/2001 |
| WO | 2009040538 | 4/2009 |

OTHER PUBLICATIONS

Ernoult, Emeric, "How to Triple Your YouTube Video Views with Facebook", SocialMediaExaminer.com, Nov. 26, 2012, 16 pages.

(Continued)

*Primary Examiner* — Chikaodili E Anyikire
(74) *Attorney, Agent, or Firm* — Esplin & Associates, PC (57) ABSTRACT

Systems and method of identifying activities and/or events represented in a video are presented herein. An activity and/or event may be represented in a video by virtue of one or both of an entity moving with a capture device during capture of the video preforming the activity and/or event, or the video portraying one or more entities performing the activity and/or event. Activity types may be characterized by one or more of common movements, equipment, spatial context, and/or other features. Events may be characterized by one or both of individual movements and/or sets of movements that may routinely occur during performance of an activity. The identification of activities and/or events represented in a video may be based on one or more spectrogram representations of sensor output signals of one or more sensors coupled to a capture device.

12 Claims, 4 Drawing Sheets

(56) References Cited

U.S. PATENT DOCUMENTS

| | | |
|---|---|---|
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Rua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0128042 A1* | 5/2013 | Bridge ............... H04N 7/18 348/143 |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0016712 A1* | 1/2015 | Rhoads ............ G06K 9/00208 382/154 |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0124071 A1* | 5/2016 | Baxley ............... G06F 16/285 348/143 |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |

(56) References Cited

U.S. PATENT DOCUMENTS

2016/0366330 A1  12/2016  Boliek
2017/0006214 A1   1/2017  Andreassen

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL:https://www.ffmpeg.org/doxyg en/2. 3/structA VP a ck et. html>.
Han et al., Deep Compression: Compressing Deep Neural Networks with Pruning, Trained Quantization and Huffman Coding, International Conference on Learning Representations 2016, 14 pgs.
He et al., "Deep Residual Learning for Image Recognition," arXiv:1512.03385, 2015, 12 pgs.
Iandola et al., "SqueezeNet: AlexNet-level accuracy with 50x fewer parameters and <0.5MB model size," arXiv:1602.07360, 2016, 9 pgs.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Ioffe et al., "Batch Normalization: Accelerating Deep Network Training by Reducing Internal Covariate Shift," arXiv:1502.03167, 2015, 11 pgs.
Parkhi et al., "Deep Face Recognition," Proceedings of the British Machine Vision, 2015, 12 pgs.
PCT International Preliminary Report on Patentability for PCT/US2015/023680, dated Oct. 4, 2016, 10 pages.
PCT International Search Report and Written Opinion for PCT/US15/12086 dated Mar. 17, 2016, 20 pages.
PCT International Search Report and Written Opinion for PCT/US2015/023680, dated Oct. 6, 2015, 13 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, dated Dec. 17, 2015, 7 pages.
Schroff et al., "FaceNet: a Unified Embedding for Face Recognition and Clustering," IEEE Conference on Computer Vision and Pattern Recognition (CVPR), 2016, 10 pgs.
Tran et al., "Learning Spatiotemporal Features with 3D Convolutional Networks", arXiv:1412.0767 [cs.CV] Dec. 2, 2014 (9 pgs).
Yang et al., "Unsupervised Extraction of Video Highlights via Robust Recurrent Auto-encoders" arXiv:1510.01442v1 [cs.CV] Oct. 6, 2015 (9 pgs).
Ricker, "First Click: TomTom's Bandit camera beats GoPro with software" Mar. 9, 2016 URL: http://www.theverge.com/2016/3/9/11179298/tomtom-bandit-beats-gopro (6 pages).
PCT International Search Report and Written Opinion for PCT/US15/18538, dated Jun. 16, 2015, 26 pages.
PCT International Search Report for PCT/US17/16367 dated Apr. 14, 2017 (2 pages).
PCT International Search Reort for PCT/US15/18538 dated Jun. 16, 2015 (2 pages).

* cited by examiner

SYSTEMS AND METHODS FOR IDENTIFYING ACTIVITIES AND/OR EVENTS REPRESENTED IN A VIDEO

FIELD

This disclosure relates to systems and methods configured to identify activities and/or events represented in a video.

BACKGROUND

Videos may be analyzed based on their visual content to identify an activity being performed during video capture. Analyzing visual content may involve techniques that are computationally expensive.

SUMMARY

This disclosure relates to systems and methods configured to identify activities and/or events represented in a video. An activity and/or event may be represented in a video by virtue of one or both of an entity moving with a capture device during capture of the video preforming the activity and/or event, or the video portraying one or more entities performing the activity and/or event. Activity types may be characterized by one or more of common movements, equipment, spatial context, and/or other features. Events may be characterized by one or both of individual movements and/or sets of movements that may routinely occur during performance of an activity.

A system that identifies activities and/or events represented in a video may include one or more physical processors, and/or other components. The one or more physical processors may be configured by machine-readable instructions. Executing the machine-readable instructions may cause the one or more physical processors to facilitate identifying activities and/or events represented in a video. The machine-readable instructions may include one or more computer program components. The computer program components may include one or more of a video component, a sensor component, a transform component, an encoding component, a performance component, and/or other computer program components.

The video component may be configured to obtain information defining one or more videos, and/or other information. Information defining a video may include, for example, a video file. A video may include one or more of visual content, audio content, and/or other content. The visual content may be presented in the form of individual frame images in a set of multiple frame images of a video. The multiple frame images may be presented in an ordered sequence. The audio content may include recorded and/or provided audio that may accompany visual content. The audio content may be synchronized with visual content.

The sensor component may be configured to obtain sensor output signals generated from one or more sensors. Sensor output signals may be generated contemporaneously with capture of a video by a capture device. Sensor output signals may span a time duration. A given sensor may include one or more of a motion sensor, a sound transducer, and/or other sensors. Sensor output signals of a motion sensor may characterize motion of a capture device over time. Sensor output signals of a sound transducer may characterize an audio component of a video.

The transform component may be configured to transform sensor output signals to a frequency domain to generate information defining individual spectrogram representations and/or individual sets of spectrogram representations of the sensor output signals. The information defining individual spectrogram representations in the set of spectrogram representation may be generated based on successions of transforms of the sensor output signals within time windows along a time duration of the sensor output signals. Time windows for an individual spectrogram representation may have an individual time length that may set an individual time resolution of the individual spectrogram representation.

The encoding component may be configured to encode information defining individual spectrogram representations and/or individual sets of spectrogram representations into an image file.

The performance component may be configured to identify one or more activities and/or events represented in a video. The identification may be based on one or both of an individual spectrogram representation of the sensor output signals or an image file having information defining a set of spectrogram representations encoded therein.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
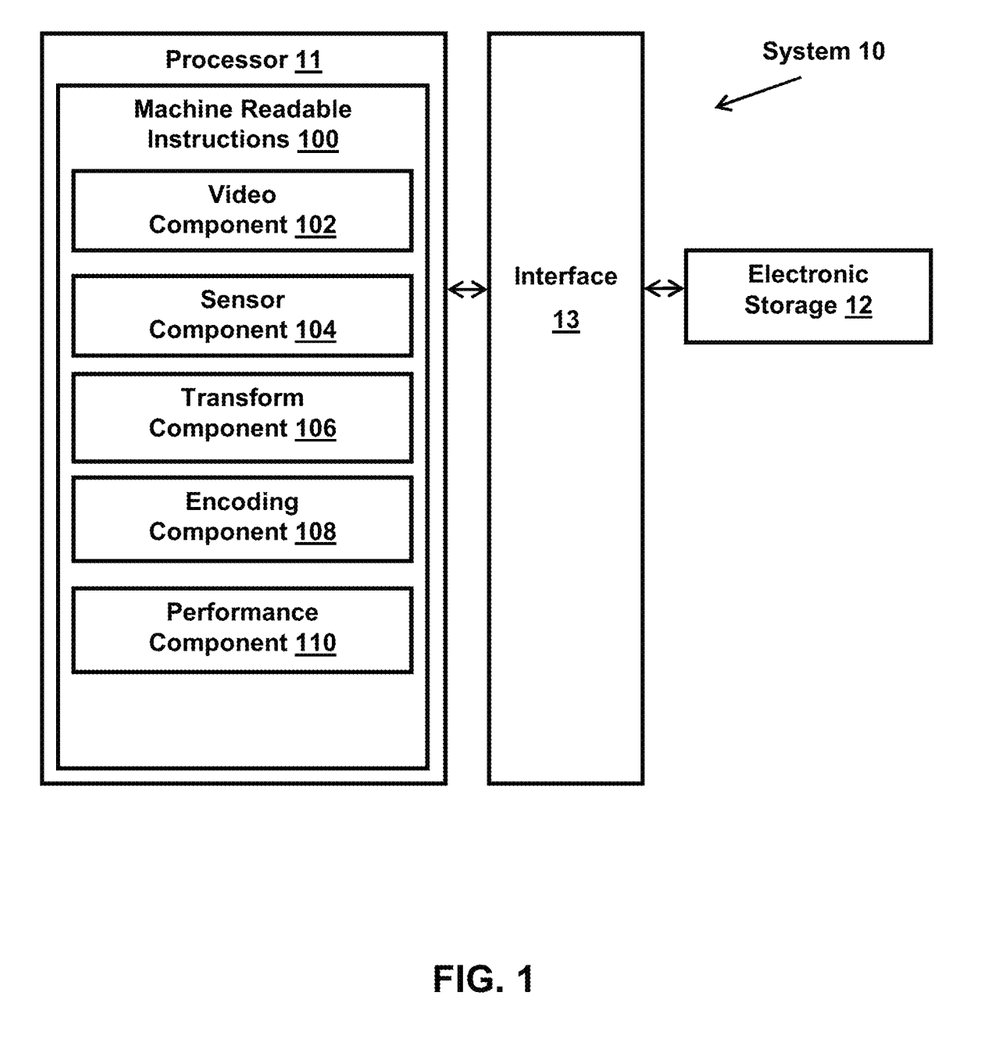
FIG. 1 illustrates a system configured to identify activities and/or events represented in a video, in accordance with one or more implementations.

FIG. 1 illustrates a system 10 configured to identify activities and/or events represented in a video, in accordance with one or more implementations. An activity and/or event may be represented in a video by virtue of one or both of an entity moving with a capture device during capture of the video preforming the activity and/or event, or the video portraying one or more entities performing the activity and/or event. Activity types may be characterized by one or more of common movements, equipment, spatial context, and/or other features. Events may be characterized by one or both of individual movements and/or sets of movements that may routinely occur during performance of an activity.

System 10 may include one or more of a processor 11, electronic storage 12, interface 13 (e.g., bus, wireless interface, etc.), and/or other components. Electronic storage 12 may include electronic storage medium that electronically stores information. Electronic storage 12 may store software algorithms, information determined by processor 11, information received remotely, and/or other information that enables system 10 to function properly. For example, electronic storage 12 may store information related to one or more of images, videos, image exemplars, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine readable instructions 100. Executing machine-readable instructions 100 may cause processor 11 to identify activities and/or events represented in a video. Machine-readable instructions 100 may include one or more computer program components. Machine readable instructions 100 may include one or more of a video component 102, a sensor component 104, a transform component 106, an encoding component 108, a performance component 110, and/or other computer program components.

In some implementations, processor 11 may be included in one or more of a server (not shown), a computing platform (not shown), a capture device (not shown), and/or other devices. By way of non-limiting illustration, a server may include processor 11 and may communicate with computing platforms via client/server architecture and/or other communication scheme. The server may be configured to provide features and/or functions of processor 11 to users via computing platforms. In some implementations, one or more features and/or functions of processor 11 may be attributed to individual computing platforms associated with users. By way of non-limiting illustration, individual computing platforms may obtain machine-readable instructions that may be the same or similar to machine-readable instructions 100 such that features and/or functions of processor 11 may be carried out locally at the individual computing platforms. In some implementations, one or more features and/or functions of processor 11 may be attributed to individual capture devices. By way of non-limiting illustration, individual capture devices may obtain machine-readable instructions that may be the same or similar to machine-readable instructions 100 such that features and/or functions of processor 11 may be carried out locally at the individual capture devices. A computing platform may include one or more of a desktop computer, a laptop computer, a smartphone, a tablet computer, and/or other computing platform. A capture device may include an action camera, a camera-enabled computing platform, and/or other devices. It is noted that in some implementations, system 10 may include one or more of one or more servers, one or more computing platforms, one or more capture devices, and/or other components described herein yet not explicitly shown in FIG. 1.

A capture device may be configured for one or both of video capture and/or image capture. A capture device may include one or more sensors coupled to the capture device, and/or other components. A sensor may be coupled to a capture device by virtue of being attached to the capture device and/or in communication with the capture device. The sensor output signals generated by an individual sensor may span an individual time duration. In some implementations, a time duration associated with generation of sensor output signals may correspond to a duration of a video captured by a capture device. For example, sensor output signals may be generated over the same or similar duration of video capture by a captured device.

In some implementations, sensors coupled to a capture device may include one or more of an image sensor, a geolocation sensor, a motion sensor, a sound transducer, an environment sensor, and/or other sensors.

An image sensor may be configured to generate output signals conveying light and/or electromagnetic radiation incident on the image sensor, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A geo-location sensor may be configured to generate output signals conveying location of a capture device, and/or other information. By way of non-limiting illustration, a geo-location sensor may comprise a GPS, and/or other sensors.

A motion sensor may be configured to generate output signals characterizing motion of a capture device over time. The motion of the capture device characterized by the output signals of the motion sensor may include one or more of speed, acceleration, rotation (e.g., pitch, roll, and/or yaw), orientation, and/or other motion. A motion sensor may include an inertial measurement unit, and/or other devices. By way of non-limiting illustration, a motion sensor may include one or more of an accelerometer, a gyroscope, a magnetometer, and/or other sensors.

A sound transducer may be configured to generate output signals conveying changes in pressure indicative of sound waves incident on the sound transducer. The output signals may characterize audio content of a video. By way of non-limiting illustration, a sound transducer may include a microphone.

An environment sensor may be configured to generate output signals conveying ambient environment information. Ambient environment information may include one or more of altitude, depth, ambient light, and/or other information. By way of non-limiting illustration, an environment sensor may include one or more of an altimeter, a pressure sensors, a light sensor, and/or other sensors.

The video component 102 may be configured to obtain information defining one or more videos, and/or other information. Information defining a video may include, for example, a video file. A video may include one or more of visual content, audio content, and/or other content. The visual content may be presented in the form of individual frame images in a set of multiple frame images of a video. The multiple frame images may be presented in an ordered sequence. The audio content may include recorded and/or provided audio that may accompany visual content. The audio content may be synchronized with visual content.

The video component 102 may be configured to obtain information defining one or more videos from one or more storage locations. A storage location may include electronic storage 12, electronic storage of one or more capture devices (not shown in FIG. 1), electronic storage of one or more computing platforms (not shown in FIG. 1), and/or other storage locations.

The video component 102 may be configured to obtain information defining one or more videos during acquisition of the information and/or after acquisition of the information by one or more capture devices. For example, video component 102 may obtain information defining one or more videos while the one or more videos are being captured by one or more capture devices. The video component 102 may obtain information defining one or more videos after the one or more videos have been captured and/or stored in memory (e.g., electronic storage 12, etc.). In some implementations, one or more videos may be characterized by one or more encoded framerates. An encoded framerate may define a number of frame images within a video per a time duration (e.g., number of frame images per second, etc.).

In some implementations, visual content may be defined by one or more of real-world visual information, electronic information, playback information, and/or other information. Real-world visual information may comprise information related to light and/or electromagnetic radiation incident on an image sensor of a capture device, and/or other information. Electronic information may comprise information related to information stored in electronic storage that conveys the light and/or electromagnetic radiation incident on an image sensor and may constitute a conversion of the real-world visual information to information suitable for electronic storage. Playback information may comprise information that may facilitate visual reproduction of the captured real-world visual information on a computing platform and/or other display device for viewing by a user, and/or other information. By way of non-limiting example, playback information may comprise a different format of the electronic information that may be readable by a playback device.

In some implementations, audio content may be defined by one or more of real-world audio information, electronic information, playback information, and/or other information. Real-world audio information may comprise information related to sound waves incident on a sound transducer and/or other sensor of a capture device, and/or other information. Electronic information may comprise information stored in electronic storage that may constitute a digital conversion of the real-world audio information to electronic information (e.g., an audio file). Playback information may comprise information that facilitates audible reproduction of captured real-world audio information on a computing platform and/or other audio reproduction device, and/or other information. By way of non-limiting example, playback information may comprise a different format of the electronic information that may be readable by a playback device.

The sensor component 104 may be configured to obtain sensor output signals generated by one or more sensors, and/or other information. The sensor component 104 may be configured to obtain sensor output signals from one or more storage locations. A storage location may include electronic storage 12, electronic storage of one or more capture devices (not shown in FIG. 1), electronic storage of one or more computing platforms (not shown in FIG. 1), and/or other storage locations. In some implementations, sensor output signals may be included in a video file defining a video, and/or may be stored separately. By way of non-limiting illustration, sensor output signals may be stored as metadata within a video file.

The sensor component 104 may be configured to obtain sensor output signals during acquisition of the sensor output signals and/or after acquisition of the sensor output signals by one or more capture devices. For example, sensor component 104 may obtain sensor output signals from one or more sensors while the one or more videos and/or sensor output are being captured by one or more capture devices. The sensor component 104 may obtain sensor output signals after the one or more videos and/or sensor output signals have been captured and/or stored in memory (e.g., electronic storage 12, etc.).

Figure 4:
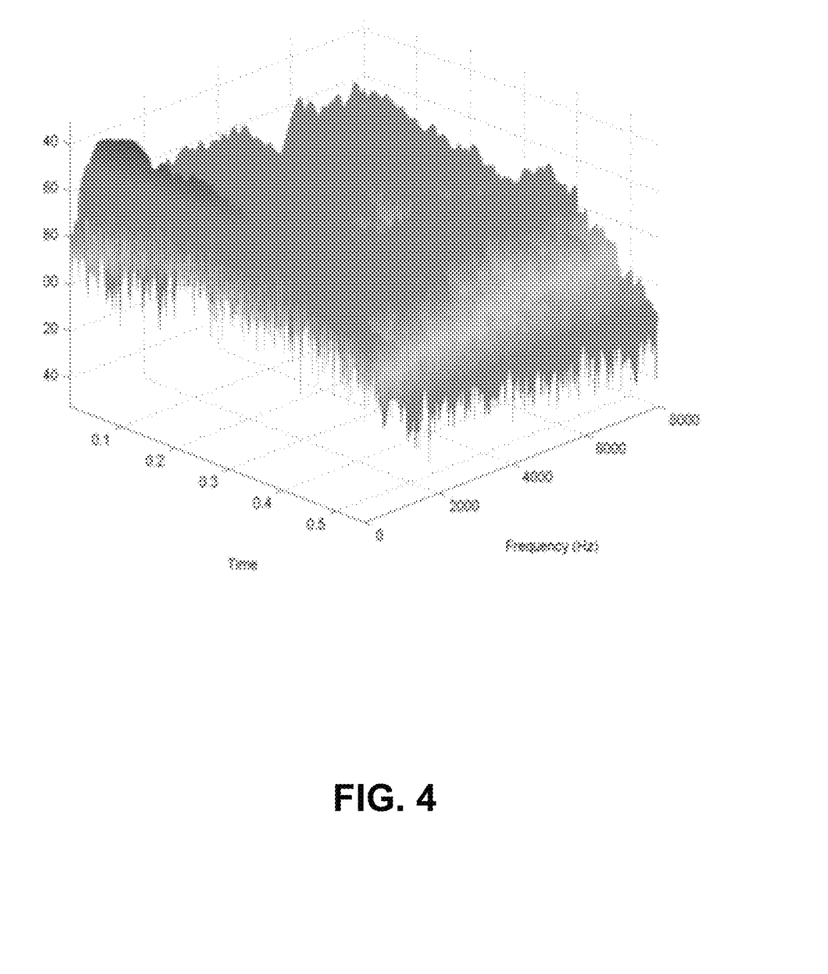
FIG. 4 illustrates an exemplary image of a spectrogram representation of a signal.

The transform component 106 may be configured to transform sensor output signals and/or other information to a frequency domain. Transforming sensor output signals and/or other information to a frequency domain may generate information defining one or more frequency domain representations of the sensor output signals. In some implementations, a frequency domain representation may comprise a spectrogram representation and/or other frequency domain representations. FIG. 4 illustrates an exemplary image of a spectrogram representation. In some implementations, one or more transforms may be applied to sensor output signals such that an individual frequency domain representation may have an individual time resolution associated with the individual frequency domain representation. One or more transforms applied to sensor output signals may generate a set of spectrogram representations. Individual spectrogram representations in the set of spectrogram representations may have individual time resolutions associated therewith.

In some implementations, transforming sensor output signals and/or other information to a frequency domain may include applying one or more Fourier transforms to the sensor output signals. A Fourier transform may include one or more of a short-time Fourier transform (STFT) (alternatively, a short-term Fourier transform), a continuous-time STFT, a discrete-time STFT, a sliding DFT, and/or other transforms.

In some implementations, information defining individual spectrogram representations may be generated based on successions of transforms of sensor output signals within time windows along a time duration of the sensor output signals. The time windows used for transformation of an individual spectrogram representation may have a time length. The time length of the time windows may set an individual time resolution of an individual spectrogram representation. In some implementations, a transform of a sensor output signals may be generated as a time window is slid along the time axis of the sensor output signals over the time duration of the sensor output signals. In some implementations, a transform of sensor output signals may be generated based on individual time segments within the sensor output signals. Individual time segments may have a time length that is the same or similar to a time window used for the transformation.

By way of non-limiting illustration, transform component 106 may be configured to transform sensor output signals to a frequency domain to generate information defining a set of spectrogram representations of the sensor output signals. The information defining individual spectrogram representations in the set of spectrogram representation may be generated based on successions of transforms of the sensor output signals within time windows along a time duration of the sensor output signals. The time windows for an individual spectrogram representation in the set of spectrogram representations may have an individual time length. An individual time length of the time windows of a transform may set an individual time resolution of an individual spectrogram representation.

In some implementations, a set of spectrogram representations of sensor output signals may include one or more of a first spectrogram representation, a second spectrogram representation, a third spectrogram representation, and/or other a spectrogram representations. The first spectrogram representation may be generated based on successions of transforms of the sensor output signals within time windows having a first time length. The second spectrogram representation may be generated based on successions of transforms of the sensor output signals within time windows having a second time length. The third spectrogram representation may be generated based on successions of transforms of the sensor output signals within time windows having a third time length. The first spectrogram representation may have a first time resolution based on using the time windows of the first time length. The second spectrogram representation may have a second time resolution based on using the time windows of the second time length. The third spectrogram representation may have a third time resolution based on using the time windows of the third time length. In some implementations, an individual time length may be one of 10 milliseconds, 200 milliseconds, 1 second, and/or other time lengths. It may generally be desired that the time windows be different enough to capture signal changes at different time scales. By way of non-limiting illustration, the first time length may be 10 milliseconds, the second time length may be 200 milliseconds, and the third time length may be 1 second.

Returning to FIG. 1, encoding component 108 may be configured to encode information defining one or more spectrogram representations into an image file. An image file may be defined by one or more channels that store information. Conventionally, individual channels of an image file may store information defining individual colors of an image. By way of non-limiting illustration, an image file may include a set of color channels. The set of color channels may include one or more of a red color channel, a green color channel, a blue color channel, and/or other color channels. A red color channel may conventionally store information defining the red visual component of an image (e.g., a red component of individual pixels of the image). A green color channel may conventionally store information defining the green visual component of an image (e.g., a green component of individual pixels of the image). A blue color channel may conventionally store information defining the blue visual component of an image (e.g., a blue component of individual pixels of the image).

The encoding component 108 may be configured to encode information defining individual spectrogram representations of a set of spectrogram representations into individual color channels of an image file. The encoded information defining the set of spectrogram representations may then be processed by processes that may conventionally handle image files (see, e.g., performance component 110).

By way of non-limiting illustration, information defining individual spectrogram representations in a set of spectrogram representations may be encoded into individual color channels of an image file such that information defining a first spectrogram representation in the set of spectrogram representations may be encoded into a first color channel of the image file, information defining a second spectrogram representation in the set of spectrogram representations may be encoded into a second color channel of the image file, information defining a third spectrogram representation in the set of spectrogram representations may be encoded into a third color channel of the image file, and/or other information defining other individual spectrogram representations in the set spectrogram representations may be encoded into other channels of the image file.

The performance component 110 may be configured to identify one or more activities and/or events represented in one or more videos. In some implementations, identification may be based on one or more spectrogram representations of sensor output signals generated by one or more sensors. In some implementations, identification may be based on an image file that includes information defining a set of spectrogram representations encoded into the image file.

In some implementations, identification may be based on one or more spectrogram representations of sensor output signals generated by one or more motion sensors. In some implementations, identification may be based on one or more spectrogram representations of sensor output signals generated by a single sensor. In some implementations, the single sensor may include one of a motion sensor, a sound transducer, and/or other sensor.

An activity and/or event may be represented in a video by virtue of one or both of an entity moving with a capture device during capture of the video preforming the activities and/or events, or the video portraying one or more entities performing the activities and/or events. Individual activities may be of one or more activity types. Activity types may be characterized by one or more of common movements, equipment, spatial context, and/or other features. Common movements may refer to movement so entities performing the activity that may conventionally define the activity. Equipment may refer to objects conventionally used in an activity. Spatial context may refer spatial relationship between an entity moving with a capture device and people and/or objects depicted in a video captured by the capture device. Events may be characterized by one or both of individual movements and/or sets of movements that may routinely occur during performance of an activity.

An activity type may include one or more of a sport type, a leisure type, and/or other types.

A sport type activity may include one or more sports characterized by one or more of common movements, equipment, spatial context, and/or other features that may be specific to individual ones of the one or more sports. By way of non-limiting illustration, sports of the sport activity type may include one or more of individual sports (e.g., tennis, track and field, golf, boxing, swimming, gymnastics, skiing, bowling, wrestling, powerlifting, mixed martial arts, tennis, archery, cycling, surfing, snowboarding, motorcycling, auto racing, and/or other individual sports), team sports (e.g., baseball, basketball, football, hockey, volleyball, tennis, and/or other team sports), and/or other sports that may be distinguishable based on one or more of common movements, equipment, spatial context, and/or other features that may be specific to individual sports. By way of non-limiting illustration, baseball may be characterized by one or more of common movements of players on a baseball diamond (e.g., running bases), equipment (e.g., bats, balls, gloves, bases, etc.), spatial context (e.g., arrangement of players on a field, a spatial relationship between a pitcher and a batter, etc.), and/or other features that may be specific to baseball.

A leisure type activity may include one or more leisure activities characterized by one or more of common movements, equipment, spatial context, and/or other features that may be specific to individual ones of the one or more leisure activities. By way of non-limiting illustration, activities of the leisure type may include one or more of walking, running, gamboling, swinging (on a swing), playing games (e.g., board games, video games, arcade games, etc.), and/or leisure activities that may be distinguishable based on one or more of common movements, equipment, spatial context, and/or other features that may be specific to individual leisure activities. By way of non-limiting illustration, swinging on a swing may be characterized by one or more of common movements of a person swinging (e.g., pendulum motion), equipment (e.g., a support structure, a swing, ropes, tree limb, etc.), spatial context, and/or other features that may be specific to swinging on a swing.

An event may be characterized by one or both of individual movements and/or sets of movements that may routinely occur during performance of an activity of a given activity type. It is noted that the amount of individual movements and/or sets of movements that may routinely occur during performance of an activity may be quite large. As such, while the below illustrates various examples of what individual movements and/or sets of movements that may routinely occur during performance of an activity of a given activity type, it is to be understood that this is for illustrative purposes only. One skilled in the art may ascertain other individual movements and/or sets of movements that may routinely occur during performance of one or more activities of one or more activity types that may be within the scope of the present disclosure.

Events occurring during performance of a sport type activity may include one or both of individual movements and/or sets of movements that may routinely occur during performance of the sport type activity. The following examples are provided for illustrative purposes.

By way of non-limiting illustration, events occurring during performance of the sport of baseball may include one or both of individual movements and/or sets of movements that may routinely occur during performance of the sport of baseball. Individual movements that may routinely occur during performance of the sport of baseball may include, for a batter, swinging a bat, and/or other individual movements. A set of movements that may routinely occur during performance of the sport of baseball, for a batter, may include dropping the bat and running to first base. Individual movements that may routinely occur during performance of the sport of baseball may include, for a fielder or baseman, catching a ball with the closure of mitt, and/or other individual movements. A set of movements that may routinely occur during performance of the sport of baseball, for a fielder or baseman, may include running for a ball, sliding for a catch, and/or making a catch.

By way of non-limiting illustration, events occurring during performance of the sport of surfing may include one or both of individual movements and/or sets of movements that may routinely occur during performance of the sport of surfing. Individual movements that may routinely occur during performance of the sport of surfing may include one or more of paddling with one or both arms, standing up on the surfboard, falling into the water, and/or other individual movements. A set of movements that may routinely occur during performance of the sport of surfing may include one or more of pumping down a wave, performing a maneuver of duck diving under an approaching wave, and/or other sets of movements.

Events occurring during performance of a leisure type activity may include one or both of individual movements and/or sets of movements that may routinely occur during performance of the leisure type activity. The following examples are provided for illustrative purposes.

By way of non-limiting illustration, events occurring during performance of the leisure activity of walking may include one or both of individual movements and/or sets of movements that may routinely occur during performance of the leisure activity of walking. Individual movements that may routinely occur during performance of the leisure activity of walking may include one or more of taking a step, stopping, turning around, performing a skip (or hop or bounce), falling, and/or other individual movements. A set of movements that may routinely occur during performance of the leisure activity of walking may include one or more of taking a series of steps while increasing speed, falling then getting back up, and/or other sets of movements.

In some implementations, one or more activities and/or events may be identified by performance component 110 using one or more machine learning techniques, and/or other techniques. Machine learning techniques may include one or more of a convolutional neural network, decision tree learning, supervised learning, minimax algorithm, unsupervised learning, semi-supervised learning, reinforcements learning, deep learning, artificial neural networks, support vector machine, clustering algorithms, genetic algorithms, random forest, and/or other techniques. A machine learning technique may be trained by providing exemplary inputs and specifying desired outputs.

In some implementations, one or more user-provided exemplars of sensor output signals from one or more sensors, one or more user-identified activities and/or events associated with the sensor output signals, and/or other information may be utilized at a training stage of a machine learning process. One or more spectrogram representations of the exemplar sensor output signals may be determined and used as exemplary inputs. The user-identified activities and/or events may be specified as the desired outputs.

In some implementations, information input into a trained machine learning process to identify one or more activities and/or events represented in a video may include one or more of an individual spectrogram representation of sensor output signals generated contemporaneously with capture of the video by a capture device, individual sets of spectrogram representations of sensor output signals generated contemporaneously with capture of the video by a capture device, individual image files including encoded information defining individual sets of spectrogram representations of sensor output signals generated contemporaneously with capture of the video by a capture device, and/or other information. The trained machine learning process may be configured to output identifications of one or more activities and/or events represented in the video.

Returning to FIG. 1, although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may include one or more virtual storage resources (e.g., cloud storage, a virtual private network, and/or other virtual storage resources). Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
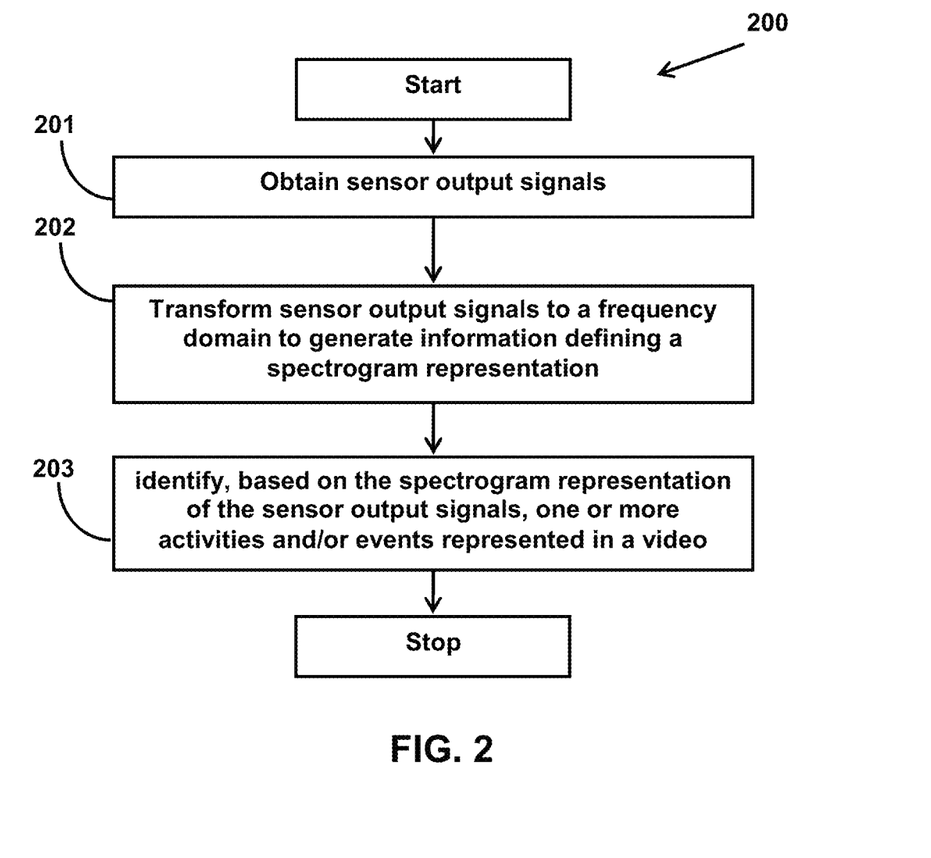
FIG. 2 illustrates a method of identifying activities and/or events represented in a video, in accordance with one or more implementations.

FIG. 2 illustrates method 200 of identifying activities and/or events represented in a video, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, sensor output signals generated from one or more motion sensors may be obtained. The sensor output signals may be generated contemporaneously with capture of a video by a capture device. The sensor output signals of the one or more motion sensors may characterize motion of the capture device over time. In some implementations, operation 201 may be performed by a processor component the same as or similar to sensor component 104 (shown in FIG. 1 and described herein).

At operation 202, sensor output signals may be transformed to a frequency domain to generate information defining one or more spectrogram representation of the sensor output signals. In some implementations, operation 202 may be performed by a processor component the same as or similar to transform component 106 (shown in FIG. 1 and described herein).

At operation 203, one or more activities and/or events represented in a video may be identified from one or more spectrogram representations of sensor output signals of one or more motion sensors. In some implementations, operation 203 may be performed by a processor component the same as or similar to performance component 110 (shown in FIG. 1 and described herein).

Figure 3:
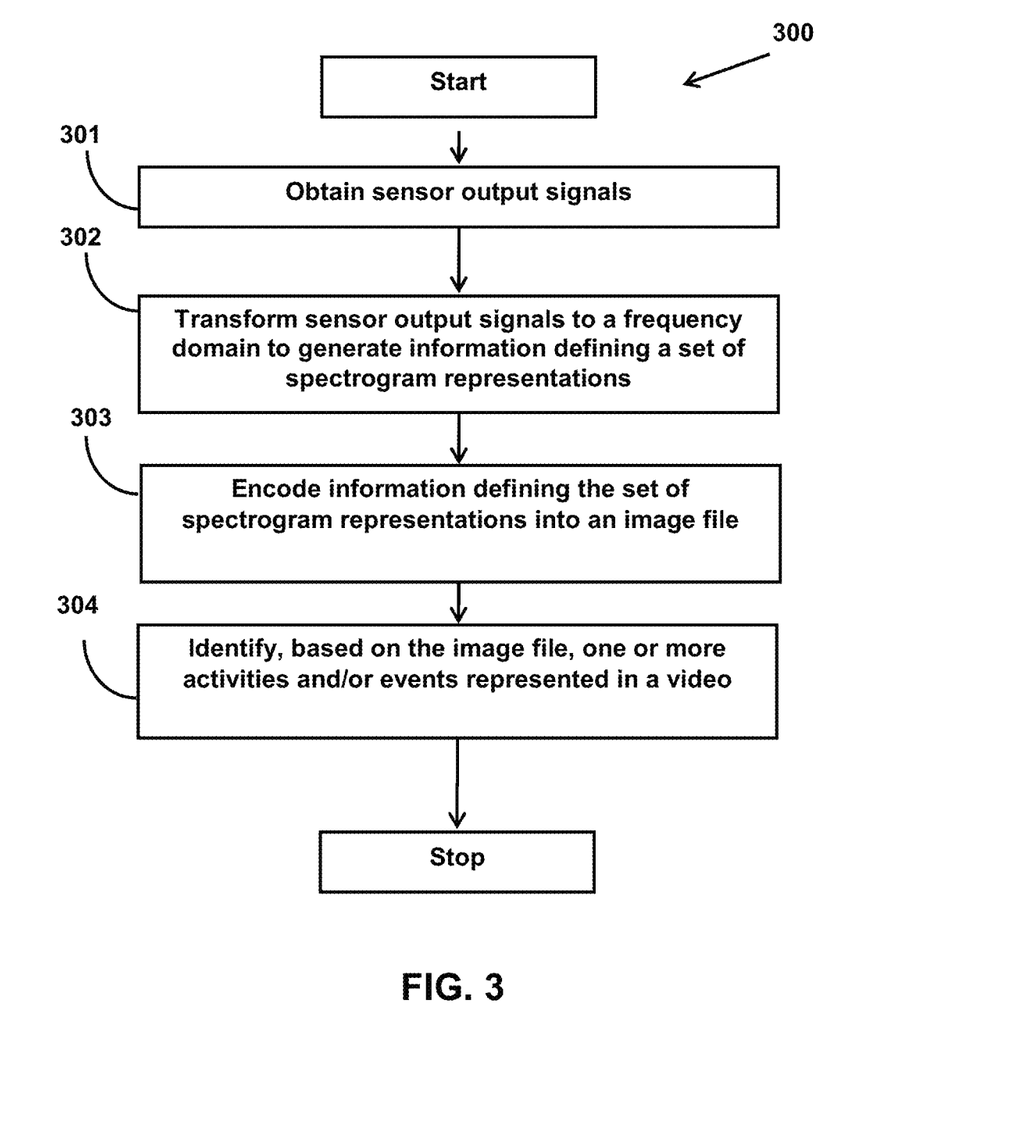
FIG. 3 illustrates a method of identifying activities and/or events represented in a video, in accordance with one or more implementations.

FIG. 3 illustrates method 300 of identifying activities and/or events represented in a video, in accordance with one or more implementations. The operations of method 300 presented below are intended to be illustrative. In some implementations, method 300 may be accomplished with one or more additional operations not described, and/or without one or more of the operations discussed. In some implementations, two or more of the operations may occur substantially simultaneously.

In some implementations, method 300 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 300 in response to instructions stored electronically on one or more electronic storage media. The one or more processing devices may include one or more devices configured through hardware, firmware, and/or software to be specifically designed for execution of one or more of the operations of method 300.

Referring to FIG. 3 and method 300, at operation 301, sensor output signals generated from one or more motion sensors may be obtained. The sensor output signals may be generated contemporaneously with capture of a video by a capture device. The sensor output signals of the one or more motion sensors may characterize motion of the capture device over time. The sensor output signals may span a time duration. In some implementations, operation 301 may be performed by a processor component the same as or similar to sensor component 104 (shown in FIG. 1 and described herein).

At operation 302, sensor output signals may be transformed to a frequency domain to generate information defining a set of spectrogram representations of the sensor output signals. The information defining individual spectrogram representations in the set of spectrogram representation may be generated based on successions of transforms of the sensor output signals within time windows along a time duration of the sensor output signals. Time windows for an individual spectrogram representation may have an individual time length that sets an individual time resolution of the individual spectrogram representation. The set of spectrogram representations of the sensor output signals may include one or more of a first spectrogram representation, a second spectrogram representation, a third spectrogram representation, and/or other spectrogram representations. The first spectrogram representation may be generated based on successions of transforms of the sensor output signals within time windows having a first time length. The second spectrogram representation may be generated based on successions of transforms of the sensor output signals within time windows having a second time length. The third spectrogram representation may be generated based on successions of transforms of the sensor output signals within time windows having a third time length. In some implementations, operation 302 may be performed by a processor component the same as or similar to transform component 106 (shown in FIG. 1 and described herein).

At operation 303, information defining a set of spectrogram representations may be encoded into an image file. The information defining individual spectrogram representations in a set of spectrogram representations may be encoded into individual color channels of the image file. By way of non-limiting illustration, information defining a first spectrogram representation may be encoded into a first color channel of the image file. Information defining a second spectrogram representation may be encoded into a second color channel of the image file. Information defining a third spectrogram representation may be encoded into a third color channel of the image file. In some implementations, operation 303 may be performed by a processor component the same as or similar to encoding component 108 (shown in FIG. 1 and described herein).

At operation 304, one or more activities and/or events represented in a video may be identified from an image file having information defining one or more spectrogram representations encoded therein. In some implementations, operation 304 may be performed by a processor component the same as or similar to performance component 108 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to identify activities and/or events represented in a video, the system comprising:
one or more physical processors configured by machine-readable instructions to:
obtain motion sensor output signals generated from a motion sensor of a capture device configured to capture the video, the motion sensor output signals being generated contemporaneously with capture of the video by the capture device, the motion sensor output signals spanning a time duration, wherein the motion sensor output signals characterize motion of the capture device over time;
generate a set of spectrogram representations of the motion sensor output signals based on a transform of the motion sensor output signals to a frequency domain, the spectrogram representation characterizing the motion of the capture device over time within the frequency domain, individual spectrogram representations in the set of spectrogram representation being generated based on successions of transforms of the motion sensor output signals within time windows along the time duration, the time windows for an individual spectrogram representation having an individual time length that sets an individual time resolution of the individual spectrogram representation, the set of spectrogram representations of the sensor output signals including:
a first spectrogram representation generated based on successions of transforms of the motion sensor output signals within time windows having a first time length;
a second spectrogram representation generated based on successions of transforms of the motion sensor output signals within time windows having a second time length; and
a third spectrogram representation generated based on successions of transforms of the motion sensor output signals within time windows having a third time length;
encode the set of spectrogram representations into an image file, the individual spectrogram representations in the set of spectrogram representations being encoded into individual color channels of the image file, such that:
the first spectrogram representation is encoded into a first color channel of the image file;
the second spectrogram representation is encoded into a second color channel of the image file; and
the third spectrogram representation is encoded into a third color channel of the image file; and
identify, based on the image file, one or more activities and/or events represented in the video.

2. The system of claim 1, wherein the motion of the capture device is related to one or more of speed, acceleration, rate of rotation, or orientation.

3. The system of claim 1, wherein the transforms comprise Fourier transforms.

4. The system of claim 1, wherein individual activities are of one or more activity types, wherein an activity type is characterized by one or more of common movements, equipment, or spatial context.

5. The system of claim 4, wherein the one or more activity types include one or more of a sports type or a leisure type.

6. The system of claim 1, wherein individual events are characterized by one or both of individual movements or sets of movements that routinely occur during performance of an activity.

7. A method of identifying activities and/or events represented in a video, the method being implemented in a computer system comprising one or more physical processors and storage media storing machine-readable instructions, the method comprising:

obtaining motion sensor output signals generated from a motion sensor of a capture device configured to capture the video, the motion sensor output signals being generated contemporaneously with capture of the video by the capture device, the motion sensor output signals spanning a time duration, wherein the motion sensor output signals characterize motion of the capture device over time;

generating a set of spectrogram representations of the motion sensor output signals based on a transform of the motion sensor output signals to a frequency domain, the spectrogram representation characterizing the motion of the capture device over time within the frequency domain, individual spectrogram representations in the set of spectrogram representation being generated based on successions of transforms of the motion sensor output signals within time windows along the time duration, the time windows for an individual spectrogram representation having an individual time length that sets an individual time resolution of the individual spectrogram representation, the set of spectrogram representations of the sensor output signals including:

a first spectrogram representation generated based on successions of transforms of the motion sensor output signals within time windows having a first time length;

a second spectrogram representation generated based on successions of transforms of the motion sensor output signals within time windows having a second time length; and a third spectrogram representation generated based on successions of transforms of the motion sensor output signals within time windows having a third time length;

encoding the set of spectrogram representations into an image file, the individual spectrogram representations in the set of spectrogram representations being encoded into individual color channels of the image file, including:

encoding the first spectrogram representation into a first color channel of the image file;

encoding the second spectrogram representation into a second color channel of the image file; and encoding the third spectrogram representation into a third color channel of the image file; and identifying, based on the image file, one or more activities and/or events represented in the video.

8. The method of claim 7, wherein the motion of the capture device is related to one or more of speed, acceleration, rate of rotation, or orientation.

9. The method of claim 7, wherein the transforms comprise Fourier transforms.

10. The method of claim 7, wherein individual activities are of one or more activity types, wherein an activity type is characterized by one or more of common movements, equipment, or spatial context.

11. The method of claim 10, wherein the one or more activity types include one or more of a sports type or a leisure type.

12. The method of claim 7, wherein individual events are characterized by one or both of individual movements or sets of movements that routinely occur during performance of an activity.

* * * * *